(12) United States Patent
Tian et al.

(10) Patent No.: US 8,737,735 B2
(45) Date of Patent: May 27, 2014

(54) SYSTEM AND METHOD OF BILATERAL IMAGE FILTERING

(75) Inventors: Chao Tian, Madison, NJ (US); Shankar Krishnan, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

(21) Appl. No.: 13/524,140

(22) Filed: Jun. 15, 2012

(65) Prior Publication Data

US 2013/0336585 A1  Dec. 19, 2013

(51) Int. Cl.
*G06K 9/00* (2006.01)

(52) U.S. Cl.
USPC ........... 382/167; 382/260; 382/274; 382/275; 358/3.26; 358/3.27; 358/463

(58) Field of Classification Search
USPC ......... 382/167, 260, 274, 275, 278; 358/3.26, 358/3.27, 463
See application file for complete search history.

(56) References Cited

U.S. PATENT DOCUMENTS

| | | | |
|---|---|---|---|
| 7,082,218 B2 * | 7/2006 | Pollard et al. | 382/167 |
| 7,426,312 B2 * | 9/2008 | Dance et al. | 382/254 |
| 7,457,477 B2 * | 11/2008 | Petschnigg et al. | 382/274 |
| 7,612,794 B2 * | 11/2009 | He et al. | 348/14.08 |
| 7,706,608 B2 * | 4/2010 | Sawada | 382/167 |
| 8,254,718 B2 * | 8/2012 | Bennett et al. | 382/275 |
| 8,295,632 B2 * | 10/2012 | Fattal | 382/266 |
| 8,355,565 B1 * | 1/2013 | Yang et al. | 382/154 |
| 8,428,342 B2 | 4/2013 | Tian et al. | |
| 8,471,932 B2 * | 6/2013 | Cote et al. | 348/241 |
| 8,571,309 B2 | 10/2013 | Krishnan et al. | |
| 8,577,169 B2 * | 11/2013 | Andrus et al. | 382/274 |
| 2013/0107979 A1 | 5/2013 | Tian | |
| 2013/0107986 A1 | 5/2013 | Tian | |

OTHER PUBLICATIONS

Durand, Frédo et al., "Fast Bilateral Filtering for the Display of High-Dynamic-Range Images," Laboratory for Computer Science, Massachusetts Institute of Technology, © 2002 by the Association for Computing Machinery, Inc., 10 pages.

Yang, Qingxiong et al., "Real-Time O(1) Bilateral Filtering," IEEE Conference on Computer Vision and Pattern Recognition (CVPR) 2009, 8 pages.

Andrew Adams et al., "Fast High-Dimensional Filtering Using the Permutohedral Lattice"; Stanford University; 2009 The Eurographics Association and Blackwell Publishing Ltd., 10 pages.

CVPR 2012 Submission #993, Anonymous CVPR submission; "A Blending Approach for Fast Color Bilateral Filtering"; Paper ID 993, 8 pages.

* cited by examiner

*Primary Examiner* — Yosef Kassa
(74) *Attorney, Agent, or Firm* — Toler Law Group, PC (57) ABSTRACT

A method includes generating a first principle bilateral filtered image component from a source image. The first principle bilateral filtered image component corresponds to a second pixel value of a set, the second pixel value greater than or equal to a first pixel value. The method includes selectively updating a result pixel of a result image based on the first principle bilateral filtered image component and deallocating the first principle bilateral filtered image component. After deallocating the first principle bilateral filtered image component, a second principle bilateral filtered image component is generated from the source image. The second principle bilateral filtered image component corresponds to a third pixel value. The third pixel value is greater than the second pixel value. The third pixel value is less than or equal to a fourth pixel value. The result pixel is selectively updated based on the second principle bilateral filtered image component.

20 Claims, 8 Drawing Sheets

SYSTEM AND METHOD OF BILATERAL IMAGE FILTERING

FIELD OF THE DISCLOSURE

The present disclosure is generally related to bilateral image filtering.

BACKGROUND

A bilateral filter is an edge-preserving smoothing filter. Bilateral filtering is a non-linear filtering technique that may combine image information from two domains. For example, in image editing, a bilateral filter may use spatial information and intensity information. Since the bilateral filter is essentially a non-linear filter, the bilateral filter may be computationally expensive to implement.

DETAILED DESCRIPTION

A system and method of bilateral image filtering is disclosed. The disclosed techniques may utilize an adaptive filtering framework that is sensitive to edges and other local image features and that may store in memory no more than one principle bilateral filtered image component at a time during computation, thereby achieving bilateral filtering with a reduced memory footprint as compared to other techniques. The disclosed techniques may be used for real time or near-real time filtering of color images (e.g., bilateral filtering of interactive applications).

For example, a source image may be received. Based on the source image, multiple principle bilateral filtered image components (PBFICs) may be iteratively generated and stored in memory. Each of the PBFICs may correspond to a particular pixel value of a subset of pixel values (e.g., pixel values 0, 50, 100, 150, 200, and 255 when possible pixel values range from 0 to 255). The subset of pixel values may be determined from the source image, from user input, or any combination thereof. Each of the PBFICs may represent a spatially filtered image of a range filtration performed on the source image, as further described with reference to FIGS. 1 and 3. The PBFICs may be used in turn to update a result image that is initialized to a blank image, as further described with reference to FIGS. 1 and 4. Each pixel in the source image may have a pixel value that falls within two pixel values of the subset (e.g., a pixel in the source image at coordinates (3, 3) may have a value of 40 which falls between 0 and 50). A result pixel corresponding to the source pixel may receive a contribution from the PBFICs corresponding to each of the two values in the subset (e.g., a pixel in the result image at coordinates (3, 3) may receive a contribution from $PBFIC_0$ in a first iteration and a contribution from $PBFIC_{50}$ in a next iteration). PBFICs may be generated and used to update the result image one-at-a-time. After being used to update the result image, a PBFIC may be deallocated (e.g., by marking for deletion, deleting, making unavailable, etc). Hence, unlike existing bilateral filtering methods that require all PBFICs to be available, at most one PBFIC may need to be allocated in memory at a time during operation of the technique disclosed herein. The reduction in memory footprint may make the disclosed technique well-suited for implementation in low memory scenarios (e.g., mobile devices) and for color image filtering.

The disclosed techniques may provide various advantages over other bilateral filtering schemes. As used herein, the notation $I(\vec{x})$ represents the value of an image at a pixel x, and $f_R(I(\vec{x}), I(\vec{y}))$ denotes a range filter kernel applied to the value of pixel x and a value of pixel y. The output of the range filter kernel may depend on the pixel values of the pixels x and y, e.g., as described further with reference to FIG. 3. A function $f_S(\vec{x}, \vec{y})$ denotes a spatial filter kernel applied to the pixels x and y. The output of the spatial filter kernel may depend on the locations of the pixels x and y, e.g., as described further with reference to FIG. 3. $I^B(\vec{x})$ denotes the output of a bilateral filtering operation on the pixel x and may be represented by the expression:

$$I^B(\vec{x}) = \frac{\sum_{\vec{y} \in N(\vec{x})} f_S(\vec{x}, \vec{y}) \cdot f_R(I(\vec{x}), I(\vec{y})) \cdot I(\vec{y})}{\sum_{\vec{y} \in N(\vec{x})} f_S(\vec{x}, \vec{y}) \cdot f_R(I(\vec{x}), I(\vec{y}))}, \quad \text{(Equation 1)}$$

where $N(\vec{x})$ is the neighborhood of pixel x.

An example of the spatial filter kernel $f_S(\vec{x}, \vec{y})$ may be a Gaussian-like spatial filter kernel represented by the expression:

$$f_S(\vec{x}, \vec{y}) = \exp\left(-\frac{\|\vec{x} - \vec{y}\|^2}{2\sigma_S^2}\right), \quad \text{(Equation 2)}$$

where exp represents an exponential function and $\sigma_S$ is the spatial filter variance.

An example of the range filter kernel $f_R(I(\vec{x}), I(\vec{y}))$ may be a Gaussian-like range filter kernel represented by the expression:

$$f_R(I(\vec{x}), I(\vec{y})) = \exp\left(-\frac{\|I(\vec{x}) - I(\vec{y})\|^2}{2\sigma_R^2}\right), \quad \text{(Equation 3)}$$

where $\sigma_R$ is the range filter variance.

Other generalizations may be used for the range filter and the spatial filter, such as a box-filter instead of the Gaussian-like spatial filter. Another generalization, namely joint bilateral filtering, may enable the range filter kernel $f_R(I(\vec{x}),I(\vec{y}))$ to operate on values of pixels of a secondary image. $I^{JB}(\vec{x})$ denotes the output of a joint bilateral filtering operation on the pixel x and may be represented as:

$$I^{JB}(\vec{x}) = \frac{\sum_{\vec{y} \in N(\vec{x})} f_S(\vec{x}, \vec{y}) \cdot f_R(I^*(\vec{x}), I^*(\vec{y})) \cdot I(\vec{y})}{\sum_{\vec{y} \in N(\vec{x})} f_S(\vec{x}, \vec{y}) \cdot f_R(I^*(\vec{x}), I^*(\vec{y}))}, \quad \text{(Equation 4)}$$

where $I^*(\vec{x})$ denotes the pixel value of a corresponding pixel x in the secondary image.

For a digital image, there are only a finite number of pixel values for each pixel (e.g., $k \in \{0, 1, 2, \ldots 255\}$). For each pixel value k in a given image, the following two quantities are functions of the pixel y:

$$W_k(\vec{y}) = f_R(k, I(\vec{y})),$$

$$J_k(\vec{y}) = W_k(\vec{y}) \cdot I(\vec{y}) \quad \text{(Equation 5)}.$$

Thus, Equation 1 may be re-written as $$I^B(\vec{x}) = I^B_{I(\vec{x})}(\vec{x}) \quad \text{(Equation 6)}.$$

where $$I^B_k(\vec{x}) \equiv \frac{J'_{I(\vec{x})}(\vec{x})}{W'_{I(\vec{x})}(\vec{x})} = \frac{\sum_{\vec{y} \in N(\vec{x})} f_S(\vec{x}, \vec{y}) \cdot J_k(\vec{y})}{\sum_{\vec{y} \in N(\vec{x})} f_S(\vec{x}, \vec{y}) \cdot W_k(\vec{y})}. \quad \text{(Equation 7)}$$

By sweeping through the possible pixel values (e.g., $k \in \{0, 1, 2, \ldots 255\}$), the bilateral filtered value for each pixel may be determined. $I^B_k(\vec{x})$ denotes a principle bilateral filtered image component (PBFIC) corresponding to pixel value k.

Computational resources may be saved by generating principle bilateral filtered image components corresponding to a subset of the possible pixel values (e.g., $L_0, L_1, \ldots L_{K-1}$, where K<256) instead of all possible pixel values. The bilateral filtered value $I^B(\vec{x})$ may be interpolated from $I^B_{L_{i-1}}(\vec{x})$ and $I^B_{L_i}(\vec{x})$.

$I^B(\vec{x})$ may be written as:

$$I^B(\vec{x}) = \frac{L_i - I(\vec{x})}{L_i - L_{i-1}} I^B_{L_{i-1}}(\vec{x}) + \frac{I(\vec{x}) - L_{i-1}}{L_i - L_{i-1}} I^B_{L_i}(\vec{x}). \quad \text{(Equation 8)}$$

Equation 8 includes both $L_i$ and $L_{i-1}$. Bilateral filtering based on Equation 8 may require all PBFICs to be stored in memory before a result image may be generated. However, Equation 8 may be decomposed into two independent steps as follows:

$$\hat{I}^B(\vec{x}) = \alpha(I(\vec{x}), i-1) I^B_{L_{i-1}}(\vec{x}) \quad \text{(Equation 9)}$$

$$I^B(\vec{x}) = \hat{I}^B(\vec{x}) + \alpha(I(\vec{x}), i) I^B_{L_i}(\vec{x}) \quad \text{(Equation 10)},$$

where $$\alpha(k, i) = \quad \text{(Equation 11)}$$

$$\frac{L_{i+1} - k}{L_{i+1} - L_i} \text{ for } k \geq L_i \text{ and } \alpha(k, i) = \frac{k - L_{i-1}}{L_i - L_{i-1}} \text{ for } k < L_i.$$

Equations 9 and 10 include one of $L_i$ and $L_{i-1}$. Instead of interpolating between $I^B_{L_{i-1}}(\vec{x})$ and if $I^B_{L_i}(\vec{x})$, the contribution from $I^B_{L_{i-1}}(\vec{x})$ may be blended into a blank image to generate an intermediate image $\hat{I}^B(\vec{x})$, and then a contribution from $I^B_{L_i}(\vec{x})$ may be blended into the intermediate image $\hat{I}^B(\vec{x})$ to generate the result image $I^B(\vec{x})$, as described further with reference to FIG. 4. $I^B_{L_{i-1}}(\vec{x})$ may be generated first, stored in memory, used to generate the intermediate image $\hat{I}^B(\vec{x})$ based on Equations 9 and 11, and deallocated. $I^B_{K_i}(\vec{x})$ may be generated next, stored in the memory, used to generate the result image $I^B(\vec{x})$ based on Equations 10 and 11, and deallocated. Thus, bilateral filtering based on Equations 9-11 may need at most one PBFIC stored in the memory at a time. Pseudo-code for an algorithm of bilateral image filtering based on Equations 9-11 may be written as:

```
Initialize image I^B to 0; L_-1=L_0; L_K=L_K-1.
for i=0 to (K-1) do
    Compute PBFIC I^B_{L_i}(x);
    for each pixel x do
        if I(x) ∈ [L_{i-1}, L_{i+1}) then
            I^B(x) ← I^B(x) + α(I(x),i) * I^B_{L_i}(x);
        endif
    endfor
endfor
```

The algorithm described above may be used for grayscale bilateral filtering, as further described with reference to FIG. 1. The algorithm may also be generalized for color bilateral filtering, where each pixel has three color components ($I_r$, $I_g$, $I_b$), as further described with reference to FIG. 2. A PBFIC ($L^r, L^g, L^b$) may be computed using:

$$W_{L^r, L^g, L^b}(\vec{y}) = f_R((L^r, L^g, L^b), I(\vec{y})),$$

$$J_{L^r, L^g, L^b}(\vec{y}) = W_{L^r, L^g, L^b}(\vec{y}) \cdot I(\vec{y}) \quad \text{(Equation 12)}$$

The filtered value of the pixel x may be interpolated using values at corresponding pixel locations from 8 PBFICs, i.e., PBFIC($L^r, L^g, L^b$) for which $(L^r, L^g, L^b) \in \{L_{i_{r-1}}{}^r, L_{i_r}{}^r\} \times \{L_{u_{g-1}}{}^g, L_{i_g}{}^g\} \times \{L_{i_{b-1}}{}^b, L_{i_b}{}^b\}$. The algorithm for color bilateral filtering may be written as:

---

Initialize image $I^B$ to $(0,0,0)$; $L_{-1}{}^c \equiv L_0{}^c$ and $L_K{}^c \equiv L_{K-1}{}^c$ for $c = r, g, b$.

for $i_r = 0$ to $(K_r - 1)$ do for $i_g = 0$ to $(K_g - 1)$ do for $i_b = 0$ to $(K_b - 1)$ do

Compute PBFIC $I^B_{L^r_{i_r}, L^g_{i_g}, L^b_{i_b}}(\vec{x})$;

for each pixel x do                 if $I_r(\vec{x}) \in [L^r_{i_r-1}, L^r_{i_r+1})$ and $I_g(\vec{x}) \in [L^g_{i_g-1}, L^g_{i_g+1})$ and $I_b(\vec{x}) \in [L^b_{i_b-1}, L^b_{i_b+1})$ then $$I^B_r(\vec{x}) \leftarrow I^B_r(\vec{x}) + \alpha(I_r(\vec{x}), I_g(\vec{x}), I_b(\vec{x}), i_r, i_g, i_b) * I^B_{L_{i_r}}(\vec{x})$$

$$I^B_g(\vec{x}) \leftarrow I^B_g(\vec{x}) + \alpha(I_r(\vec{x}), I_g(\vec{x}), I_b(\vec{x}), i_r, i_g, i_b) * I^B_{L_{i_g}}(\vec{x})$$

$$I^B_b(\vec{x}) \leftarrow I^B_b(\vec{x}) + \alpha(I_r(\vec{x}), I_g(\vec{x}), I_b(\vec{x}), i_r, i_g, i_b) * I^B_{L_{i_b}}(\vec{x})$$

endif             endfor         endfor     endfor endfor where $\alpha(k_r, k_g, k_b, i_r, i_g, i_b) = \alpha(k_r, i_r) * \alpha(k_g, i_g) * \alpha(k_b, i_b)$ and $$\alpha(k_c, i_c) = \frac{L^c_{i_c+1} - k_c}{L^c_{i_c+1} - L^c_{i_c}} \text{ for } k_c \geq L^c_{i_c}$$

and $$\alpha(k_c, i_c) = \frac{k - L^c_{i_c-1}}{L^c_{i_c} - L^c_{i_c-1}} \text{ for } k_c < L^c_{i_c}$$

(Equation 13), for $c = r, g, b$.

The color bilateral filtering may be performed on a downsampled image of an original image. However, the full resolution original image may still be used to determine $\alpha(k_c, i_c)$.

The components of a color space may be highly correlated. Thus, color bilateral filtering may be performed on an orthogonally color transformed image of the original image to reduce the correlation of the color components, as described with reference to FIG. 2. The reduced correlation of the color components may enable bilateral filtering to be performed on the orthogonally color transformed image using fewer PBFICs than the original image. An orthogonal transformation may be a dot product of the source image with an orthogonal transform (i.e., a square matrix such that an inverse of the square matrix is equal to a transpose of the square matrix). For example, the following integer transform may be used:

$$T = \begin{bmatrix} 1 & 1 & 1 \\ 0 & 1 & -1 \\ 2 & -1 & -1 \end{bmatrix}.$$ (Equation 14)

It may be noted that T may not define an orthogonal transform without dividing with normalization factor ($\sqrt{3}$, $\sqrt{2}$, $\sqrt{6}$). However, because only the difference between the color components may be of interest, the normalization may be carried out when generating W and J values. The same normalization may be carried out on the difference between the consecutive principle bilateral filtered component levels, e.g., $L_{i-1}^r$ and $L_i^r$, to prevent degradation of filter quality. The transform may change the dynamic range of each color channel so a search may be performed in the transformed image to find minimum and maximum color component values. Utilizing T, the number of principle bilateral filtered image components used for color bilateral filtering may be reduced from 6×6×6 (i.e., 216) to 10×3×3 (i.e., 90). The transformed image may be used to form the W image according to Equation 12. However, to form the J image, the original image may be used to determine $I(\vec{y})$ in Equation 12. This combination of the W image and the J image may be considered a joint bilateral filtering where the transformed image is the secondary image in Equation 4.

In a particular embodiment, a method includes generating a first principle bilateral filtered image component from a source image. The first principle bilateral filtered image component corresponds to a second pixel value of a set of pixel values. The second pixel value is greater than or equal to a first pixel value of the set of pixel values. The method includes selectively updating a result pixel of a result image based on the first principle bilateral filtered image component and deallocating the first principle bilateral filtered image component. After deallocating the first principle bilateral filtered image component, a second principle bilateral filtered image component is generated from the source image. The second principle bilateral filtered image component corresponds to a third pixel value of the set of pixel values. The third pixel value is greater than the second pixel value. The third pixel value is less than or equal to a fourth pixel value of the set of pixel values. The result pixel is selectively updated based on the second principle bilateral filtered image component.

In another particular embodiment, a system includes one or more processors and a principle bilateral filtered image component generator executable by the one or more processors to generate a first principle bilateral filtered image component from a source image. The first principle bilateral filtered image component corresponds to a second pixel value of a set of pixel values. The second pixel value is greater than or equal to a first pixel value of the set of pixel values. The principle bilateral image component generator is also executable by the one or more processors to, after the first principle bilateral filtered image component is deallocated, generate a second principle bilateral filtered image component from the source image. The second principle bilateral filtered image component corresponds to a third pixel value of the set of pixel values. The third pixel value is less than or equal to a fourth pixel value of the set of pixel values. The system includes a result image updater executable by the one or more processors to selectively update a result pixel of a result image based on the first principle bilateral filtered image component, deallocate the first principle bilateral filtered image component, and selectively update the result pixel based on the second principle bilateral filtered image component.

In another particular embodiment, a computer-readable medium stores instructions that, when executed by a processor, cause the processor to generate a first principle bilateral filtered image component from a source image. The first principle bilateral filtered image component corresponds to a second pixel value of a set of pixel values. The instructions are also executable to cause the processor to determine whether a source pixel of the source image has a pixel value between a first pixel value of the set and a third pixel value of the set, where the first pixel value is less than or equal to the second pixel value and the third pixel value is greater than or equal to the second pixel value. The instructions are further executable to cause the processor to, when the pixel value is between the first pixel value and the third pixel value, update a result pixel in a result image based on the first principle bilateral filtered image component. The instructions are further executable to cause the processor to deallocate the first principle bilateral filtered image component and after deallocating the first principle bilateral filtered image component, generate a second principle bilateral filtered image component from the source image. The second principle bilateral filtered image component corresponds to the third pixel value. The instructions are further executable to cause the processor to determine whether the pixel value of the source pixel is between the second pixel value and a fourth pixel value, where the fourth pixel value is greater than or equal to the third pixel value. The instructions are further executable to cause the processor to, when the pixel value is between the second pixel value and the fourth pixel value, update the result pixel based on the second principle bilateral filtered image component.

Figure 1:
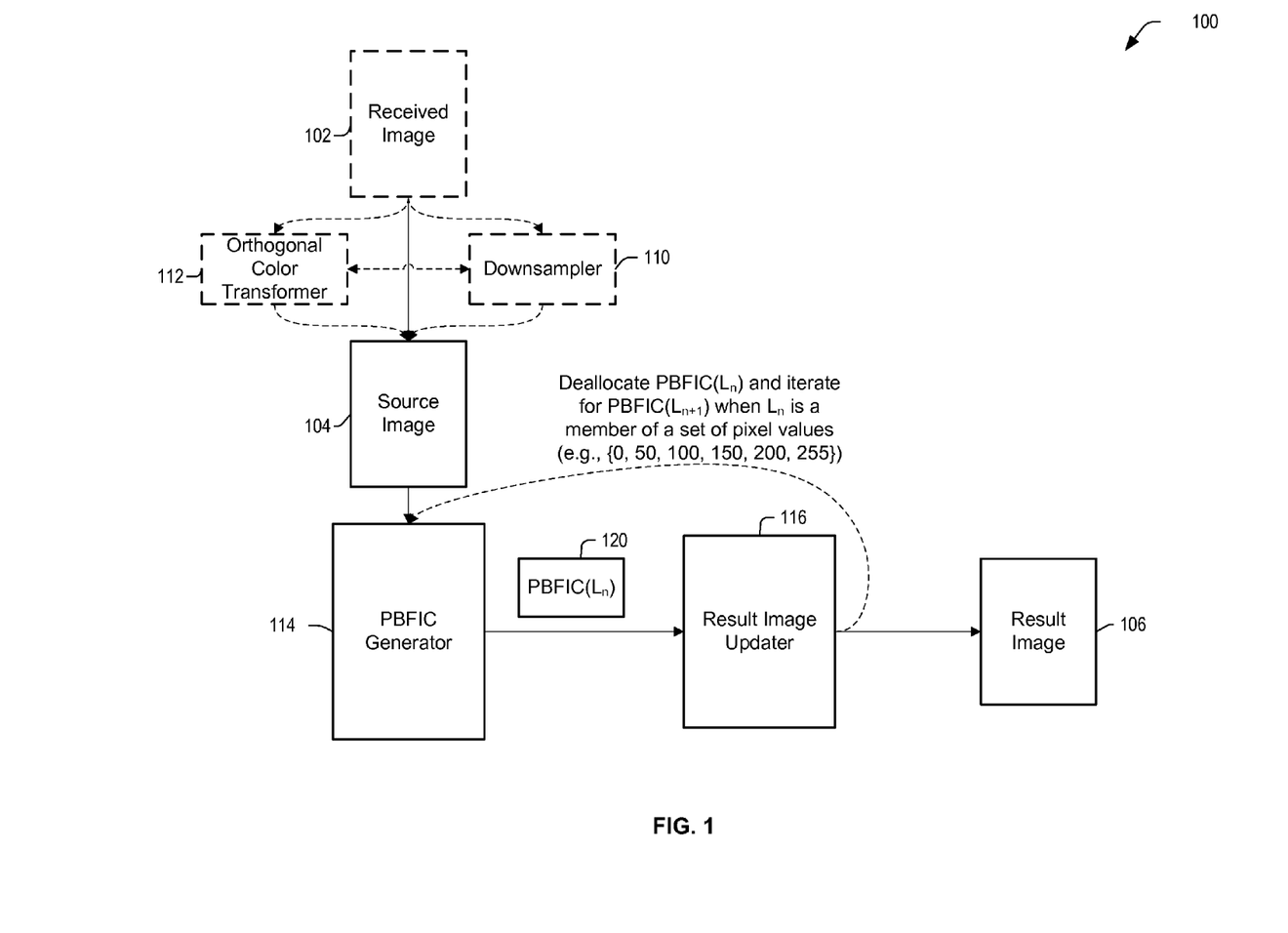
FIG. 1 is a block diagram to illustrate a first particular embodiment of a system that is operable to perform bilateral filtering of an image.

Referring to FIG. 1, a block diagram of a particular embodiment of a system that is operable to perform bilateral filtering of an image is illustrated and is generally designated 100. In particular embodiments, components of the system 100 may be implemented in hardware and/or as instructions executable by a processor, such as a dedicated graphics processing unit (GPU) or other processor, as further described with reference to FIG. 8.

The system 100 includes a PBFIC generator 114 that receives a source image 104 as input. In a particular embodiment, the source image 104 is represented by digital data. In some embodiments, the system 100 may further include a downsampler 110 configured to generate the source image 104 from a received image 102. The source image 104 may be a low-resolution image generated by downsampling the received image 102. Alternatively, or in addition, the system 100 may include an orthogonal color transformer 112 configured to generate the source image 104 from the received image 102. The source image 104 may be generated by orthogonally transforming the received image 102 such that color components of pixel values of the source image 104 have a reduced correlation compared to color components of pixel values of the received image 102. When the orthogonal color transformer 112 is used, fewer principle bilateral filtered image components may be generated while processing the color transformed source image 104 than the received image 102. In a particular embodiment, the orthogonal color transformer 112 may receive input from the downsampler 110. In another particular embodiment, the downsampler 110 may receive input from the orthogonal color transformer 112.

The PBFIC generator 114 may generate an $n^{th}$ PBFIC (denoted $PBFIC_{L_n}$) 120, where $L_n \in \{L_0, L_1, \ldots L_{K-1}\}$ (e.g., $L_n \in \{0, 50, 100, 150, 200, \text{and } 255\}$ when pixel values are represented using 8 bits). $L_0, L_1, \ldots L_{K-1}$ may correspond to an intensity component of a pixel value and may be generated based on the source image 104. $L_0$ may be less than or equal to a minimum source pixel value (e.g., 0) in the source image 104 and $L_{K-1}$ may be greater than or equal to a maximum source pixel value (e.g., 255) in the source image 104. For example, the $PBFIC_{L_n}$ 120 may be generated by applying a range filter kernel $f_R(L_n, I(\vec{x}))$ to each pixel x in the source image 104, where $I(\vec{x})$ is a value of an intensity component of the pixel x, and then applying a spatial filter $f_S$, as further described with reference to FIG. 3. The $PBFIC_{L_n}$ 120 may be stored in memory.

The system 100 may further include a result image updater 116 configured to selectively update result pixels of a result image 106 based on the $PBFIC_{L_n}$ 120. For example, each result pixel corresponding to a source pixel with a pixel value greater than or equal to $L_{n-1}$ and less than or equal to $L_{n+1}$ may receive a weighted contribution from the $PBFIC_{L_n}$ 120, as further described with reference to FIG. 4. The $PBFIC_{L_n}$ 120 may then be deallocated (e.g., deleted from the memory, marked for deletion, made unavailable to the result image updater 116, etc.) and the PBFIC generator 114 may iteratively generate another PBFIC (e.g., $PBFIC_{L_{n+1}}$).

After all PBFICs (e.g., $PBFIC_0, PBFIC_{50}, \ldots PBFIC_{255}$) have been generated and used to update the result image 106, the result image 106 may represent a bilaterally filtered version of the source image 104.

The system 100 may thus enable bilateral filtering for images. Advantageously, at most only one principle bilateral filtered image component may be allocated and/or stored in the memory at any time. In a particular embodiment, the system 100 may be used for flash-no-flash image fusion. For example, a no-flash image may be used to capture ambient illumination and a flash image may be used to capture detail.

The flash and no-flash images may be fused, using the system 100, to generate an image that captures both the ambient light and the detail. For example, image fusion may include bilateral color filtering of the no-flash image and the flash image. The image fusion may also include joint bilateral filtering of the no-flash image using the flash image as the secondary image. The system 100 may also be used in image abstraction.

Figure 2:
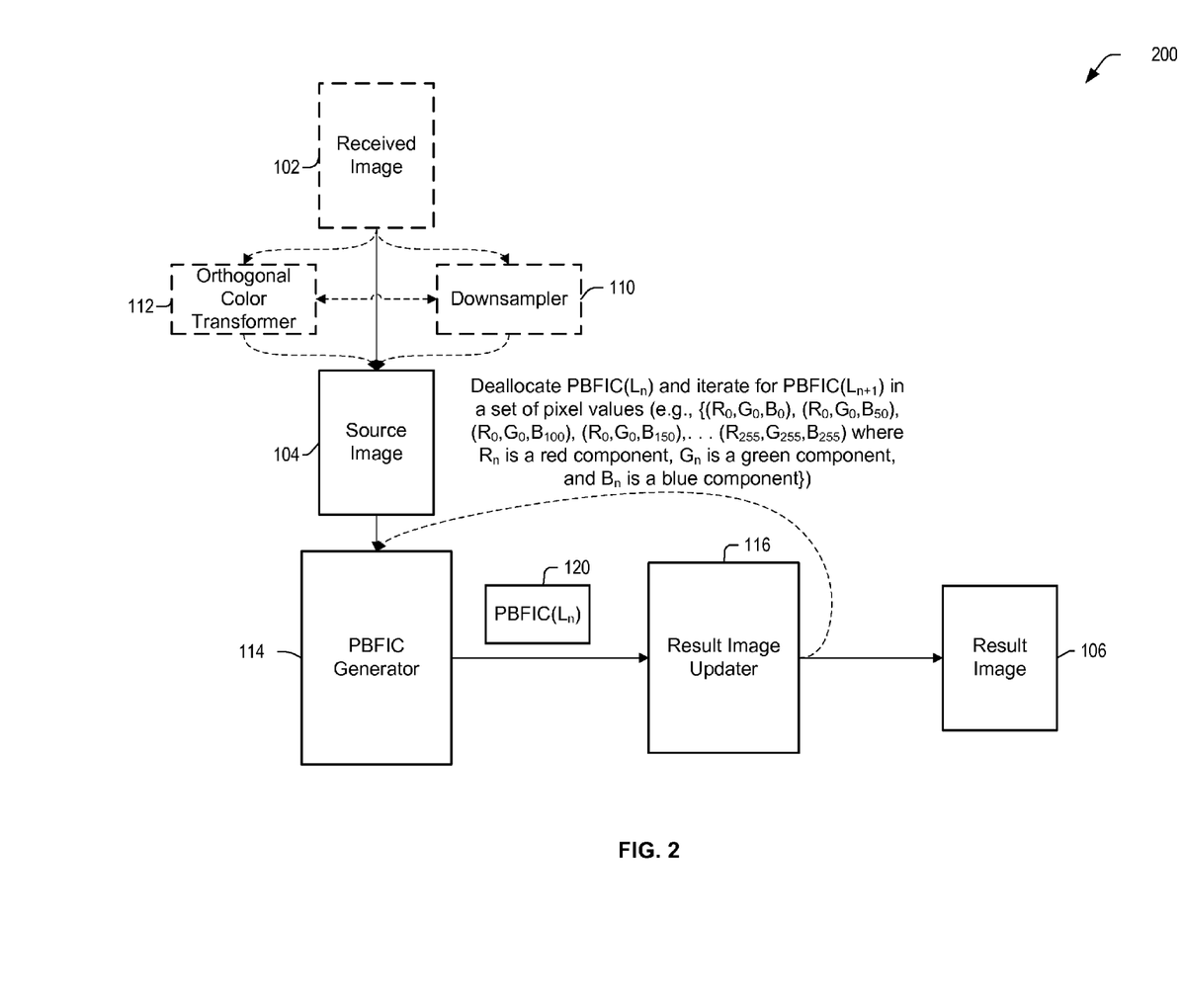
FIG. 2 is a block diagram to illustrate a second particular embodiment of the system of FIG. 1.

Whereas FIG. 1 illustrates bilateral filtering of one-dimensional (e.g., grayscale) pixels, FIG. 2 illustrates an embodiment of the system 100 of FIG. 1, generally designated 200, that is operable to perform bilateral filtering on multi-dimensional (e.g., color) pixels. As shown in FIG. 2, each of the pixel values of the source image 104 may have color components (e.g., $L_n \in \{(R_0, G_0, B_0), (R_0, G_0, B_{50}), (R_0, G_0, B_{100}), (R_0, G_0, B_{150}), \ldots (R_{255}, G_{255}, B_{255})\}$ where $R_n$ is a red component, $G_n$ is a green component, and $B_n$ is a blue component). Alternatively, the color components of a pixel value may include a cyan component, a magenta component, a yellow component, and a black component. The $PBFIC_{L_n}$ 120 may correspond to a combination of the color components (e.g., $(R_0, G_0, B_0)$) and the result image updater 116 may be configured to update the result pixel of the result image 106 when color components of a corresponding source pixel of the source image 104 are within particular ranges (e.g., the result pixel of the result image 106 may be updated if a red component of the corresponding source pixel is greater than or equal to $R_{n-1}$ and less than or equal to $R_{n+1}$, a green component of the corresponding source pixel is greater than or equal to $G_{n-1}$ and less than or equal to $G_{n+1}$, and a blue component of the corresponding source pixel is greater than or equal to $B_{n-1}$ and less than or equal to $B_{n+1}$).

During operation, the source image 104 may be received by the PBFIC generator 114, where each pixel in the source image 104 has color components. For example, as shown in FIG. 2, each pixel in the source image 104 may have a red component, a green component, and a blue component. PBFICs may be generated for combinations of the 3 color components corresponding to $L_n \in \{0, 50, 100, 150, 200, 255\}$ for each of red, green, and blue components (i.e., 6 red components×6 green components×6 blue components=216 PBFICs). When the orthogonal color transformer 112 is used, the number of PBFICs generated may be reduced to, for example, 10×3×3 (i.e., 90). After all PBFICs are generated and used, the result image 106 may represent a bilaterally filtered version of the source image 104.

The system 200 of FIG. 2 may thus enable bilateral filtering of a color image where at most one principle bilateral filtered image component is stored in memory at a time.

Figure 3:
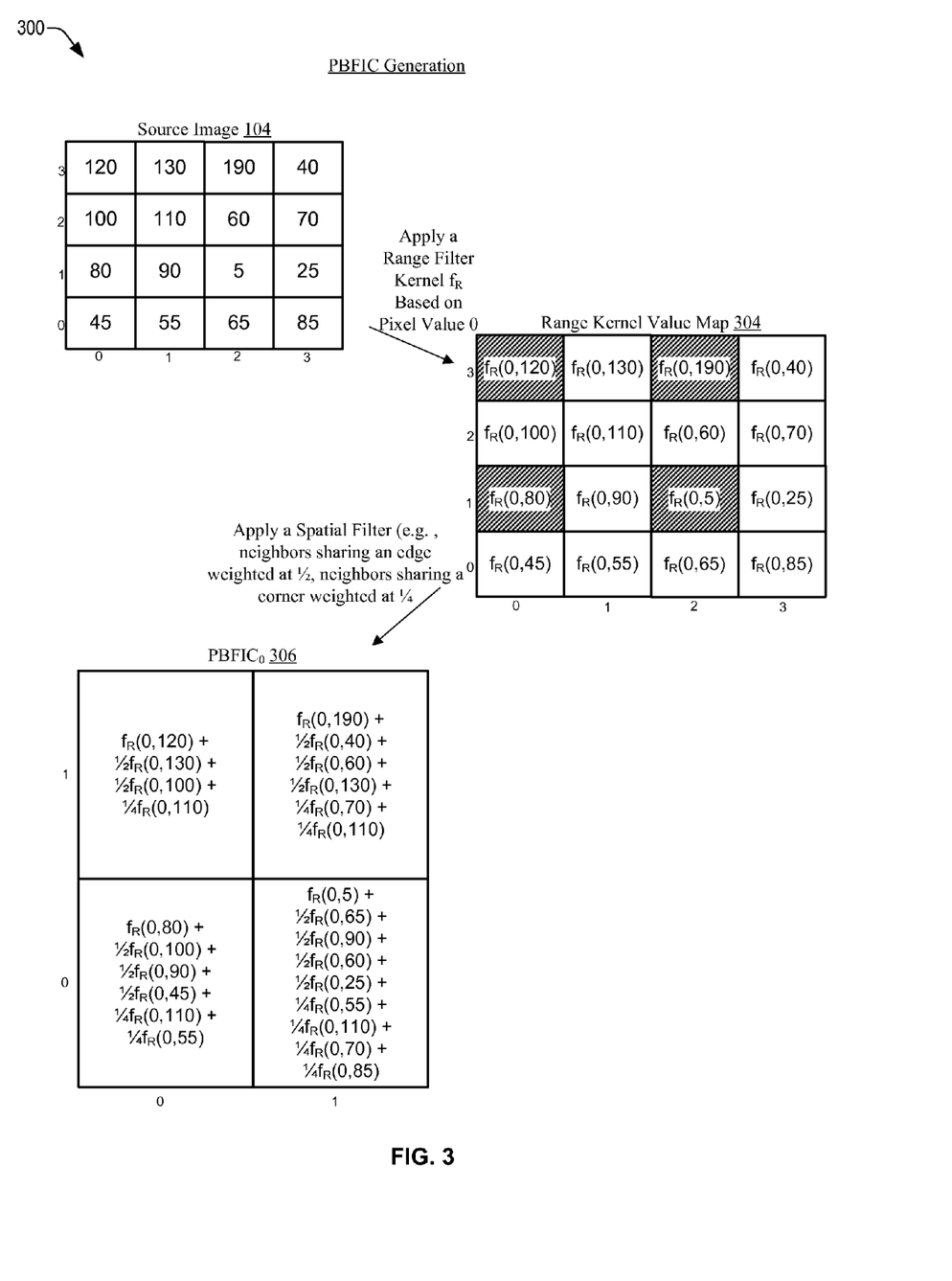
FIG. 3 is a diagram to illustrate a particular embodiment of operation of the principle bilateral filtered image component (PBFIC) generator of the system of FIG. 1.
Figure 4:
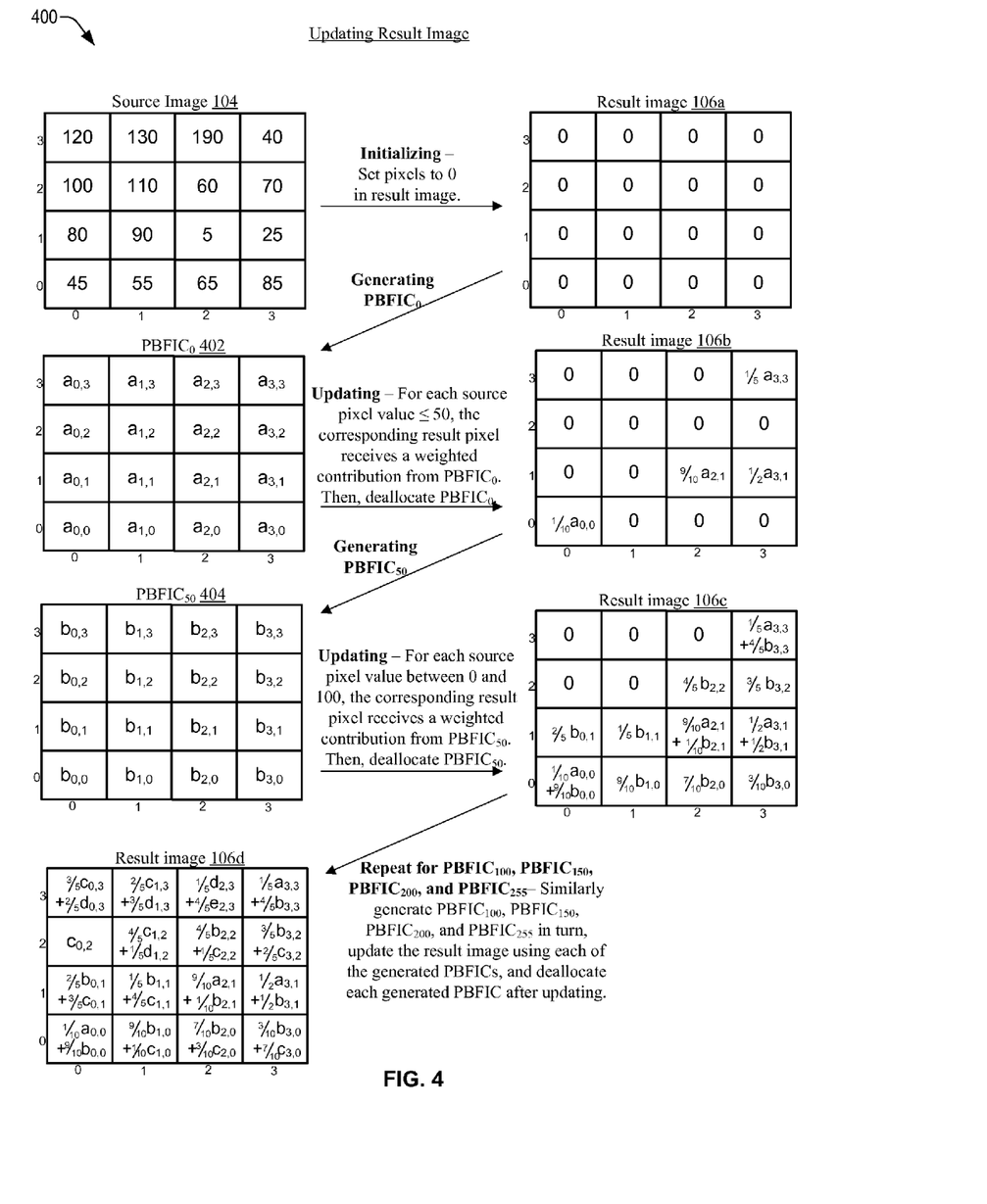
FIG. 4 is a diagram to illustrate a particular embodiment of operation of the result image updater of the system of FIG. 1.

FIGS. 3-4 illustrate particular examples of operation of various components of the system 100 of FIG. 1 and the system 200 of FIG. 2. For example, FIG. 3 illustrates a particular example of operation of the PBFIC generator 114 of FIGS. 1-2, and is generally designated 300. As shown in FIG. 3, the PBFIC generator 114 may receive the source image 104 and may produce a $PBFIC_0$ 306 (e.g., corresponding to the $PBFIC_{L_n}$ 120 of FIG. 1, where $L_n=0$).

The source image 104 may include a plurality of pixels. Each pixel in the source image 104 has coordinates (x, y). In a particular embodiment, the source image 104 has 4×4=16 pixels. A range kernel value map 304 may be generated by applying a range filter kernel $f_R(L_n, I(\vec{x}))$ to each pixel x of the source image 104 (e.g., $f_R(0,120)$ for pixel at coordinates (0,3) with pixel value 120). The PBFIC$_0$ 306 may be generated by applying the spatial filter $f_S$ to the range kernel value map 304. Applying the spatial filter $f_S$ may include determining a set of neighboring pixels of a pixel in the range kernel value map 304 and adding weighted values for each of the neighboring pixels to a value of the pixel, where the weight applied to a particular neighboring pixel is based on a spatial proximity of the particular neighboring pixel to the pixel. Neighboring pixels may be defined based on the spatial filter variance $u_S$ of the source image. For example, when the spatial filter variance $u_S$ is equal to 2, pixels that share a corner or an edge with a particular pixel may be considered neighbors of the particular pixel. To illustrate, the shaded pixels in the range kernel value map 304 may have neighbors N as follows. The shaded pixel at coordinates (0, 1) may share an edge with the pixels at coordinates (0, 0), (1, 1), and (0, 2), and share a corner with the pixels at coordinates (1, 0) and (1, 2). The shaded pixel at coordinates (2, 1) may share an edge with the pixels at coordinates (2, 0), (1, 1), (3, 1), and (2, 2), and share a corner with the pixels at coordinates (1, 0), (3, 0), (1, 2), and (3, 2). The shaded pixel at coordinates (0, 3) may share an edge with the pixels at coordinates (0, 2) and (1, 3), and share a corner with the pixel at coordinates (1, 2). The shaded pixel at coordinates (2, 3) may share an edge with the pixels at coordinates (2, 2), (1, 3), and (3, 3), and share a corner with the pixels at coordinates (1, 2) and (3, 2).

In a particular embodiment, the spatial filter may indicate that contributions from pixels sharing an edge have a higher weight (e.g., ½) than contributions from pixels sharing a corner (e.g., ¼) and that a pixel may receive a full contribution from itself. Thus, in the PBFIC$_0$ 306, the pixel at location (0, 3) receives a ½ weighted contribution from edge-sharing pixels (0, 2) and (1, 3), a ¼ weighted contribution from corner-sharing pixel (1, 2), and a full contribution from itself. When $\sigma_S$ is larger, more pixels may be considered neighboring pixels. For example, the pixels that share a corner or an edge with the neighboring pixels when $\sigma_S$ is equal to 2 may also be considered neighbors when $\sigma_S$ is equal to 3. The PBFIC$_{L_0}$ 306 may have a smaller pixel resolution (e.g., 2×2 in FIG. 2) than the source image 104 based on spatial filter variance the $\sigma_S$. When the resolution of the source image 104 is N×N, the resolution of the PBFIC$_{L_0}$ 306 may be X/$\sigma_S$×Y/$\sigma_S$. For example, the resolution of the source image 104 in FIG. 3 is 4×4 and the resolution of the PBFIC$_{L_0}$ 306 is 2×2 with $\sigma_S$=2. The PBFIC$_{L_0}$ 306 may be upsampled before being used to update the result image 106. In a particular embodiment, the upsampled PBFIC$_{L_0}$ 306 may include only the upsampled pixels that will be used to update the result image (i.e., pixels corresponding to source pixel values less than or equal to 50) instead of all the upsampled pixels.

FIG. 4 illustrates a particular embodiment of operation of generating a result image (e.g., at the result image updater 116 of FIGS. 1-2) and is generally designated 400. A result image 106*a* may be initialized by setting each result pixel to a first value (e.g., value 0). A PBFIC$_0$ 402 may be generated by the PBFIC generator 114 of FIG. 1 for n=0. Based on the PBFIC$_0$ 402, each result pixel of the result image 106*a* corresponding to a source pixel value less than or equal to $L_{n+1}$ (i.e., each result pixel corresponding to a source pixel of value ≤50) may be updated with a weighted contribution from PBFIC$_0$ 402 to generate result image 106*b* according to the formulae:

$$\frac{L_{n+1} - \text{source\_pixel\_value}}{L_{n+1} - L_n} \text{ when source\_pixel\_value} \geq L_n, \text{ and}$$

$$\frac{\text{source\_pixel\_value} - L_{n-1}}{L_n - L_{n-1}} \text{ when source\_pixel\_value} < L_n.$$

For example, because the source pixel value (i.e., 40) at coordinates (3, 3) is less than $L_{n+1}$ (i.e., 50), the result pixel at coordinates (3, 3) may be updated using PBFIC$_0$ 402. The source pixel value (i.e., 40) may be greater than $L_n$ (i.e., 0), so the weight may be $L_{n+1}$ (i.e., 50)–the source pixel value (i.e., 40) divided by $L_{n+1}$ (i.e., 50)–$L_n$ (i.e., 0). Thus, the result pixel at coordinates (3, 3) may be updated by ⅕ of the pixel value (i.e., indicated by $a_{3,3}$) at coordinates (3, 3) of PBFIC$_0$ 402. The PBFIC$_0$ 402 may be deallocated after being used to update the result image 106*a* to the result image 106*b*.

Next, PBFIC$_{50}$ 404 may be generated by the PBFIC generator 114 of FIG. 1 for $L_n$=50. The PBFIC$_{L_{50}}$ 404 may be upsampled before being used to update the result image 106. In a particular embodiment, the upsampled PBFIC$_{L_{50}}$ 404 may include only the upsampled pixels that will be used to update the result image (i.e., pixels corresponding to source pixel values greater than or equal to 0 and less than or equal to 100) instead of all the upsampled pixels. Based on the PBFIC$_{50}$ 404, each result pixel of the result image 106*b* corresponding to a source pixel value greater than or equal to $L_{n-1}$ and less than or equal to $L_{n+1}$ (i.e., each result pixel corresponding to a source pixel value ≥0 and ≤100) may be updated with a weighted contribution from PBFIC$_{50}$ 404 to generate result image 106*c*. For example, because the source pixel value (i.e., 40) at coordinates (3, 3) is greater than or equal to $L_{n-1}$ (i.e., 0) and less than or equal to $L_{n+1}$ (i.e., 100), the result pixel at coordinates (3, 3) may be updated using PBFIC$_{50}$ 404. The source pixel value (i.e., 40) may be less than $L_n$ (i.e., 50), so the weight may be source pixel value (i.e., 40)–$L_{n-1}$ (i.e., 0) divided by $L_n$ (i.e., 50)–$L_{n-1}$ (i.e., 0). Thus, the result pixel at coordinates (3, 3) may be updated by ⅘ of the pixel value (i.e., indicated by $b_{3,3}$) at coordinates (3, 3) of PBF/C$_{50}$ 404. The PBF/C$_{50}$ 404 may be generated and deallocated after being used to update the result image 106*b* to a result image 106*c*.

Similarly, a PBFIC may be generated for each remaining value of n in turn, the result pixels may be updated based on the generated PBFIC, and the PBFIC may be deallocated after updating the result pixels thereby producing a final result image 106*d*.

It will be appreciated that by updating the result image based on weighted contributions from a single PBFIC at a time, as illustrated in FIG. 4, bilateral filtering may be performed by using at most one PBFIC allocated and/or stored in memory.

Figure 5:
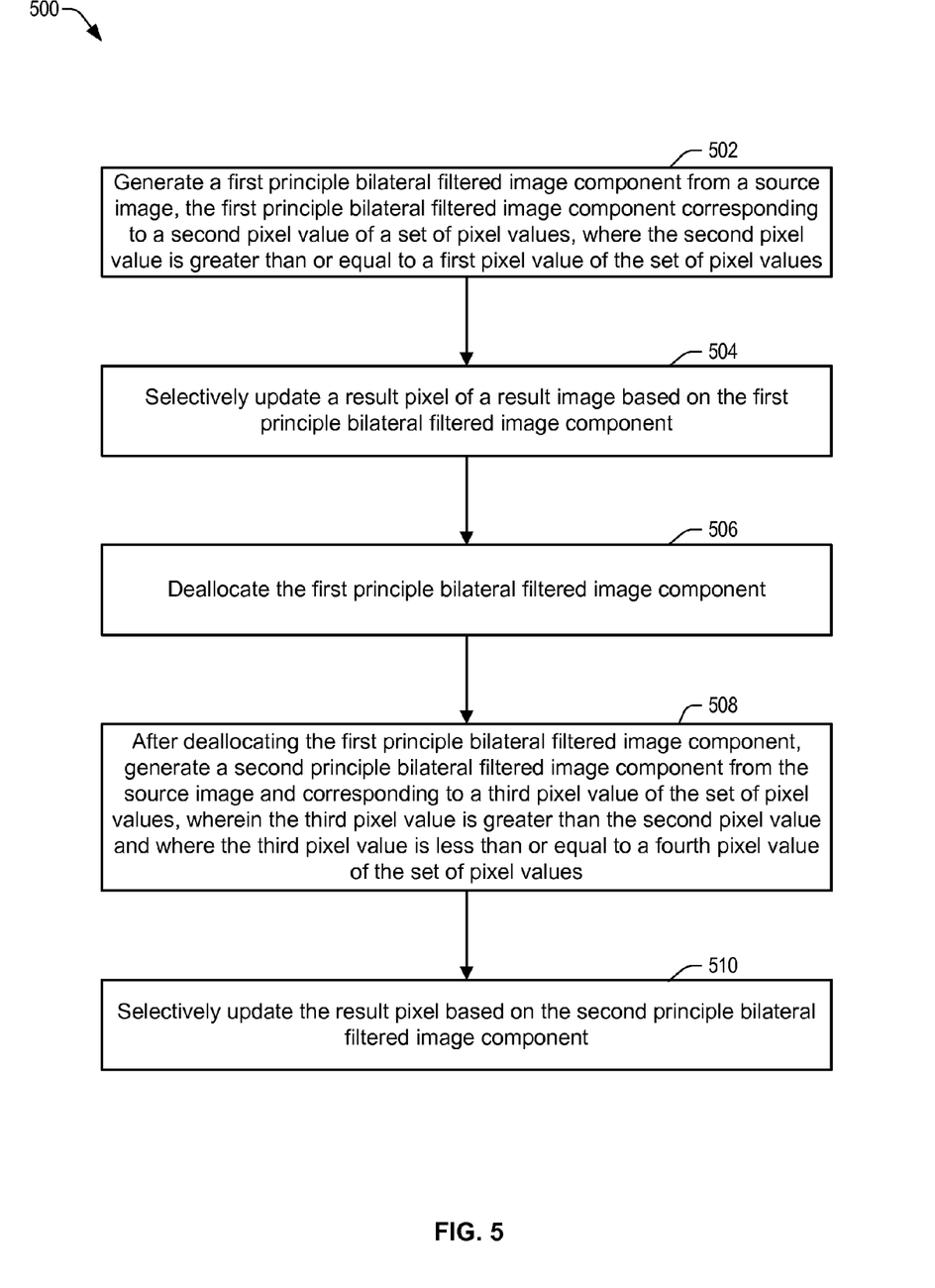
FIG. 5 is a flowchart to illustrate a particular embodiment of a method of performing bilateral filtering of an image.

FIG. 5 is a flowchart to illustrate a particular embodiment of a method 500. In an illustrative embodiment, the method 500 may be performed by the system 100 of FIG. 1 and may be illustrated with reference to FIGS. 3-4.

The method 500 may include generating a first principle bilateral filtered image component from a source image, the first principle bilateral filtered image component corresponding to a first pixel value of a set of pixel values, at 502. For example, in FIG. 1 the PBFIC generator 114 may receive the source image 104 and may generate the $PBFIC_{L_n}$ 120. In an illustrative embodiment, the PBFIC generator 114 may generate $PBFIC_{L_n}$ 120, where $L_n$ is a pixel value with color components, as described with reference to FIG. 2. For example, the PBFIC generator 120 may generate the $PBFIC_0$ 306 (corresponding to the $PBFIC_{L_n}$ 120 of FIG. 1) by generating the range kernel value map 304 by applying the range filter kernel $f_R(L_n, I(\vec{x}))$ to each source pixel x of the source image 104 and applying the spatial filter $f_S$ to the generated range kernel value map 304, as described with reference to FIG. 3.

The method 500 may also include selectively updating a result pixel of a result image based on the first principle bilateral filtered image component, at 504, and deallocating the first principle bilateral filtered image component, at 506. The method 500 may further include, after deallocating the first principle bilateral filtered image component, generating a second principle bilateral filtered image component from the source image and corresponding to a second pixel value, at 508, and selectively updating the result pixel based on the second principle bilateral filtered image component, at 510. For example, in FIG. 1 the result image updater 116 may selectively update the result image 106 based on the $PBFIC_{L_n}$ 120, deallocate the $PBFIC_{L_n}$ 120, and then generate $PBFIC_{L_{n+1}}$ for use by the result image updater 116 to update the result image 106. In an illustrative embodiment, the result image updater 116 may update the result image 106 as shown in FIG. 4.

Figure 6:
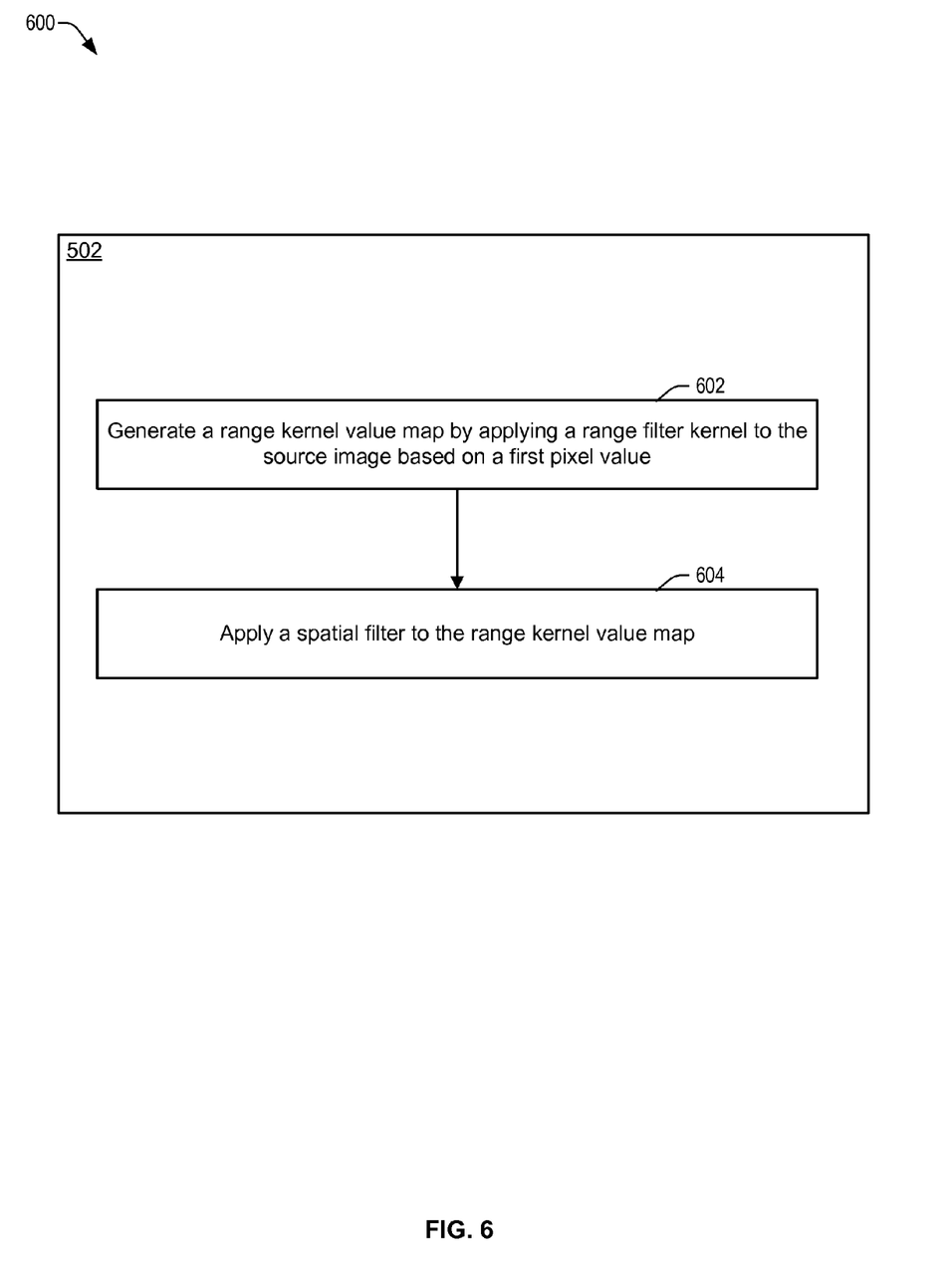
FIG. 6 is a flow chart to illustrate a particular embodiment of generating a principle bilateral filtered image component.

FIG. 6 is a flowchart to illustrate a particular embodiment of a method 600 of generating a PBFIC. In an illustrative embodiment, the method 600 may be performed to generate the first PBFIC at step 502 and the second PBFIC at step 508 of the method 500 of FIG. 5.

The method 600 may include generating a range kernel value map by applying a range filter kernel to the source image based on a first pixel value, at 602. The method 600 may also include applying a spatial filter to the range kernel value map, at 604. For example, the PBFIC generator 114 may apply the range filter kernel $f_R$ to the source image 104 to generate the range kernel value map 304 and then apply the spatial filter $f_S$ to the range kernel value map 304, as described with reference to FIG. 3.

Figure 7:
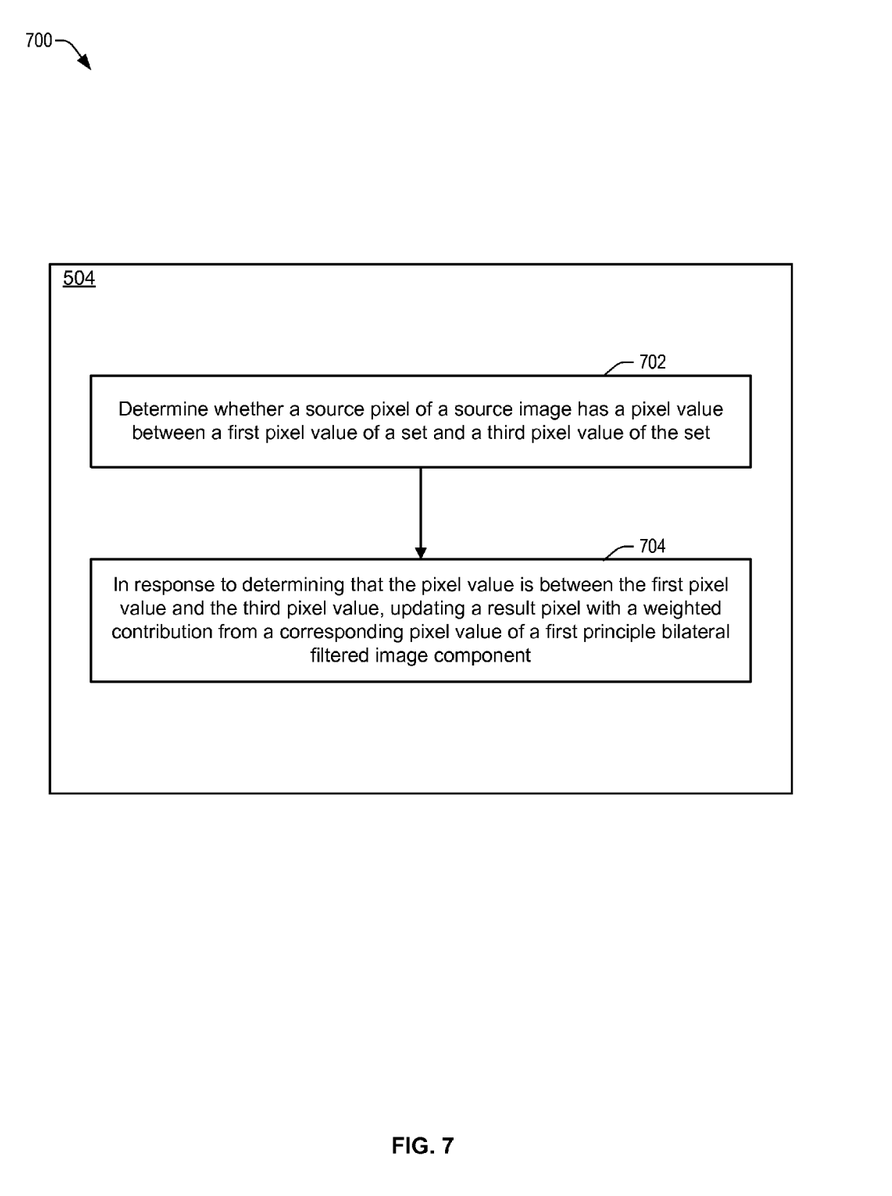
FIG. 7 is a flow chart to illustrate a particular embodiment of selectively updating a result pixel based on a principle bilateral filtered image component.

FIG. 7 is a flowchart to illustrate a particular embodiment of a method 700 of updating a result image. In an illustrative embodiment, the method 700 may be performed to update the result image at step 504 of the method 500 of FIG. 5.

The method 700 may include determining whether a source pixel of a source image has a pixel value between a first pixel value of a set and a third pixel value of the set, where the first pixel value is less than or equal to a second pixel value of the set and the third pixel value is greater than or equal to the second pixel value, at 702. The method 700 may also include, in response to determining that the second pixel value is between the first pixel value and the third pixel value, updating a result pixel with a weighted contribution from a corresponding pixel value of a first principle bilateral filtered image component, at 704. For example, the result image updater 116 may determine whether the source pixel at location (3,3) of the source image 104 has a value between 0 and 100. In response to determining that the value 40 of the source pixel is between 0 and 100, the result image updater 116 may update the result pixel at location (3,3) with a weighted contribution from a corresponding pixel value of the $PBFIC_{50}$ 404 (i.e., update the result image 106b at location (3,3) with $\frac{4}{5} b_{3,3}$), as described with reference to FIG. 4.

Figure 8:
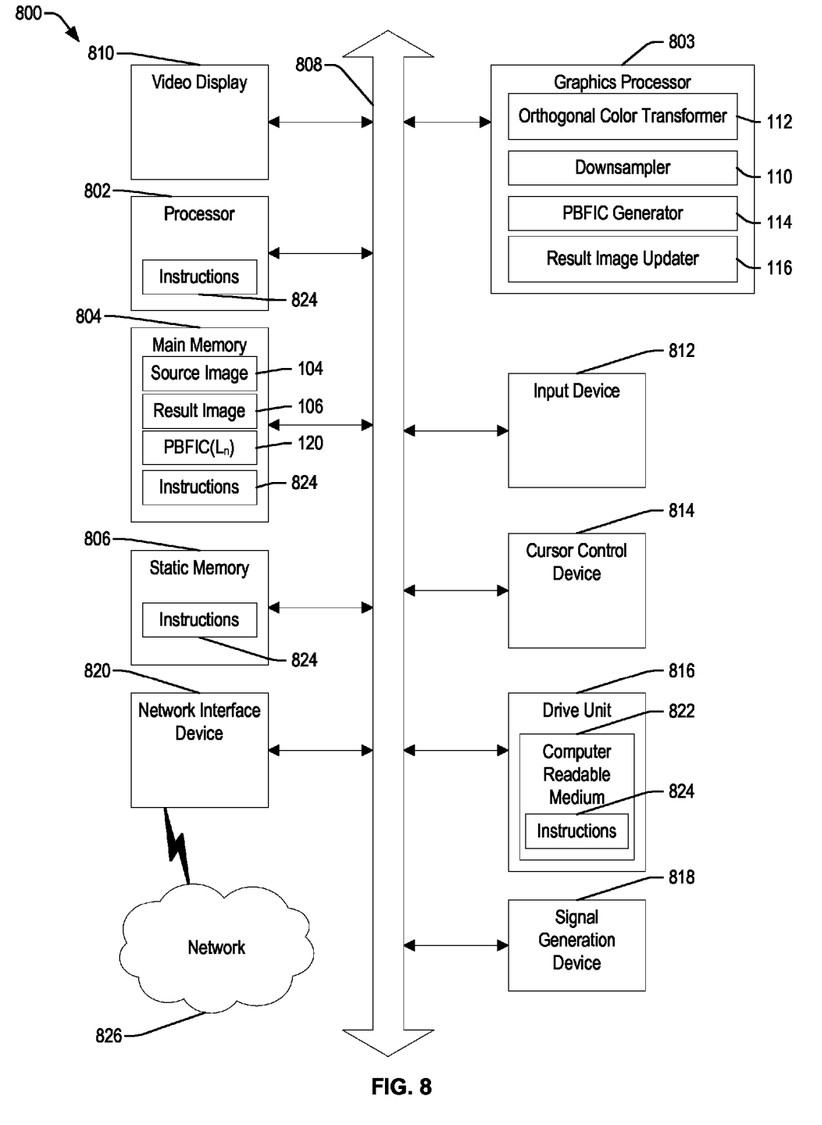
FIG. 8 is a block diagram of an illustrative embodiment of a general computer system operable to support embodiments of computer-implemented methods, computer program products, and system components as illustrated in FIGS. 1-7.

Referring to FIG. 8, an illustrative embodiment of a general computer system is shown and is designated 800. For example, the computer system 800 may include, implement, or be implemented by one or more components of the system 100 of FIG. 1. The computer system 800 includes or has access to a set of instructions that can be executed to cause the computer system 800 to perform any one or more of the methods and computer-based and/or processor-based functions disclosed herein. The computer system 800, or any portion thereof, may operate as a standalone device or may be connected, e.g., using a network, to other computer systems or peripheral devices.

In a networked deployment, the computer system 800 may operate in the capacity of a set-top box device, a personal computing device, a mobile computing device, or some other computing device. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU). The computer system 800 may also include a graphics processor 803, (e.g., a dedicated graphics processor). In a particular embodiment, the graphics processor 803 may include hardware corresponding to components of the system 100 of FIG. 1 and/or execute instructions corresponding to components of the system 100 of FIG. 1, such as the orthogonal color transformer 112 of FIG. 1, the downsampler 110 of FIG. 1, the PBFIC generator 114 of FIG. 1, and the result image updater 116 of FIG. 1. The graphics processor 803 may also be operable to perform processes and methods disclosed herein, such as the methods FIGS. 5-7. In a particular embodiment, the graphics processor 803 may execute instructions via compute unified device architecture (CUDA), a parallel graphics computing platform that enables programming instructions in languages such as C, C++, and FORTRAN to be issued to a graphics processor. In one implementation, the graphics processor 803 may achieve real time or near-real time bilateral filtering performance at rates of approximately 24-60 frames per second on 1.25 mega pixel images.

Moreover, the computer system 800 can include a main memory 804 and a static memory 806 that can communicate with each other via a bus 808. As shown, the computer system 800 may further include or be coupled to a video display unit 810, such as a liquid crystal display (LCD), an organic light emitting diode (OLED), a flat panel display, a solid-state display, or a projection display. For example, the video display unit 810 may be an HD television or monitor. Additionally, the computer system 800 may include an input device 812, such as a keyboard, a remote control device, and a cursor control device 814, such as a mouse. In a particular embodiment, the cursor control device 814 may be incorporated into a remote control device such as a television or set-top box remote control device. The computer system 800 can also include a disk drive unit 816, a signal generation device 818, such as a speaker or remote control device, and a network interface device 820. The network interface device 820 may be coupled to other devices (not shown) via a network 826.

In a particular embodiment, as depicted in FIG. 8, the disk drive unit 816 may include a computer-readable non-transitory medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 and/or the graphics processor 803 during execution by the computer system 800. The main memory 804, the processor 802, and the graphics processor 803 also may include (e.g., on-board) computer-readable non-transitory media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing and parallel processing. Alternatively, virtual computer system processing can be constructed to implement one or more of the methods or functionality as described herein.

The present disclosure contemplates a computer-readable non-transitory medium that includes instructions 824 so that a device connected to a network 826 can communicate voice, video, or data over the network 826. Further, the instructions 824 may be transmitted or received over the network 826 via the network interface device 820 (e.g., via uploading and/or downloading of an image filtering application or program).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
generating a first principle bilateral filtered image component from a source image, the first principle bilateral filtered image component corresponding to a second pixel value of a set of pixel values, wherein the second pixel value is greater than or equal to a first pixel value of the set of pixel values;
selectively updating a result pixel of a result image based on the first principle bilateral filtered image component;
deallocating the first principle bilateral filtered image component;
after deallocating the first principle bilateral filtered image component, generating a second principle bilateral filtered image component from the source image, the second principle bilateral filtered image component corresponding to a third pixel value of the set of pixel values, wherein the third pixel value is greater than the second pixel value and wherein the third pixel value is less than or equal to a fourth pixel value of the set of pixel values; and
selectively updating the result pixel based on the second principle bilateral filtered image component.

2. The method of claim 1, wherein the set of pixel values includes a minimum pixel value and a maximum pixel value, wherein the minimum pixel value of the set is less than or equal to a minimum source pixel value in the source image, and wherein the maximum pixel value of the set is greater than or equal to a maximum source pixel value in the source image.

3. The method of claim 1, wherein each pixel value of the set of pixel values includes an intensity component.

4. The method of claim 1, wherein each pixel value of the set of pixel values includes a red component, a green component, and a blue component.

5. The method of claim 1, wherein each pixel value of the set of pixel values includes a cyan component, a magenta component, a yellow component, and a black component.

6. The method of claim 1, further comprising generating the set of pixel values based on the source image.

7. The method of claim 1, wherein generating the first principle bilateral filtered image component includes:
generating a range kernel value map by applying a range filter kernel to the source image based on the second pixel value; and
applying a spatial filter to the range kernel value map.

8. The method of claim 7, wherein applying the spatial filter to the range kernel value map comprises for each pixel in the range kernel value map:
determining a set of neighboring pixels of the pixel; and
adding weighted values of each of the neighboring pixels to a value of the pixel, wherein a weight applied to a particular neighboring pixel is based on a spatial proximity of the particular neighboring pixel to the pixel.

9. The method of claim 1, wherein selectively updating the result pixel based on the first principle bilateral filtered image component includes:
determining whether a source pixel of the source image has a pixel value between the first pixel value and the third pixel value; and
in response to determining that the pixel value is between the first pixel value and the third pixel value, updating the result pixel with a weighted contribution from a corresponding pixel value of the first principle bilateral filtered image component.

10. The method of claim 1, further comprising generating the source image by downsampling a received image.

11. The method of claim 1, wherein the first principle bilateral filtered image component has a smaller pixel resolution than the source image.

12. The method of claim 11, further comprising upsampling the first principle bilateral filtered image component before updating the result pixel based on the first principle bilateral filtered image component.

13. The method of claim 12, wherein the upsampled first principle bilateral filtered image component includes only upsampled pixels corresponding to pixels in the source image having values between the first pixel value and the third pixel value.

14. The method of claim 1, further comprising generating the source image from an orthogonal color transformation of a received image.

15. A system comprising:
one or more processors;
a principle bilateral filtered image component generator executable by the one or more processors to:
generate a first principle bilateral filtered image component from a source image, the first principle bilateral filtered image component corresponding to a second pixel value of a set of pixel values, wherein the second pixel value is greater than or equal to a first pixel value of the set of pixel values; and
after the first principle bilateral filtered image component is deallocated, generate a second principle bilateral filtered image component from the source image, the second principle bilateral filtered image component corresponding to a third pixel value of the set of pixel values, wherein the third pixel value is greater than the second pixel value and wherein the third pixel value is less than or equal to a fourth pixel value of the set of pixel values; and
a result image updater executable by the one or more processors to:
selectively update a result pixel of a result image based on the first principle bilateral filtered image component;

deallocate the first principle bilateral filtered image component; and selectively update the result pixel based on the second principle bilateral filtered image component.

16. The system of claim 15, further comprising a downsampler executable by the one or more processors to generate the source image by downsampling a received image.

17. The system of claim 15, further comprising an orthogonal color transformer executable by the one or more processors to generate the source image from an orthogonal color transformation of a received image.

18. A computer-readable medium storing instructions that, when executed by a processor, cause the processor to:

generate a first principle bilateral filtered image component from a source image, the first principle bilateral filtered image component corresponding to a second pixel value of a set of pixel values;

determine whether a source pixel of the source image has a pixel value between a first pixel value of the set and a third pixel value of the set, wherein the first pixel value is less than or equal to the second pixel value and the third pixel value is greater than or equal to the second pixel value; and when the pixel value is between the first pixel value and the third pixel value, update a result pixel in a result image based on the first principle bilateral filtered image component;

deallocate the first principle bilateral filtered image component;

after deallocating the first principle bilateral filtered image component, generate a second principle bilateral filtered image component from the source image, the second principle bilateral filtered image component corresponding to the third pixel value;

determine whether the pixel value of the source pixel is between the second pixel value and a fourth pixel value, wherein the fourth pixel value is greater than or equal to the third pixel value; and when the pixel value is between the second pixel value and the fourth pixel value, update the result pixel based on the second principle bilateral filtered image component.

19. The computer-readable medium of claim 18, wherein generating the first principle bilateral filtered image component includes:

generating a range kernel value map by applying a range filter kernel to the source image based on the second pixel value; and applying a spatial filter to the range kernel value map.

20. The computer-readable medium of claim 19, wherein applying the spatial filter to the range kernel value map comprises for each pixel in the range kernel value map:

determining a set of neighboring pixels of the pixel; and adding weighted values of each of the neighboring pixels to a value of the pixel, wherein a weight applied to a particular neighboring pixel is based on a spatial proximity of the particular neighboring pixel to the pixel.

* * * * *